(12) United States Patent
Ramirez Flores et al.

(10) Patent No.: US 9,520,957 B2
(45) Date of Patent: Dec. 13, 2016

(54) GROUP RECOGNITION AND PROFILING

(75) Inventors: Axel Ramirez Flores, Cary, NC (US); Mark Charles Davis, Durham, NC (US); Bradley Park Strazisar, Cary, NC (US); Scott Edwards Kelso, Cary, NC (US); Steven Richard Perrin, Raleigh, NC (US); Yi Zhou, Raleigh, NC (US); Howard J. Locker, Cary, NC (US); Jian Li, Chapel Hill, NC (US); Jianbang Zhang, Raleigh, NC (US); Jennifer Greenwood Zawacki, Hillsborough, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 997 days.

(21) Appl. No.: 13/213,408

(22) Filed: Aug. 19, 2011

(65) Prior Publication Data

US 2013/0047175 A1 Feb. 21, 2013

(51) Int. Cl.
*H04H 60/46* (2008.01)
*H04H 60/45* (2008.01)
*H04N 21/422* (2011.01)
*H04N 21/4223* (2011.01)
*H04N 21/442* (2011.01)
*H04N 21/45* (2011.01)
*H04H 60/65* (2008.01)

(52) U.S. Cl.
CPC ............ *H04H 60/45* (2013.01); *H04H 60/46* (2013.01); *H04H 60/65* (2013.01); *H04N 21/4223* (2013.01); *H04N 21/42202* (2013.01); *H04N 21/44218* (2013.01); *H04N 21/4532* (2013.01)

(58) Field of Classification Search
CPC ............ H04N 21/4756; H04N 21/4532; H04N 21/25891; H04N 21/44218; H04N 21/4826; H04N 21/42202; H04N 21/4223; H04N 21/4661; H04N 21/4667; H04N 21/4668; G06Q 30/0631; G06Q 30/0269; G06Q 50/01; H04H 60/45; H04H 60/46
USPC ........... 725/9, 11, 12, 14, 32, 34–35, 37, 39, 46,725/58
See application file for complete search history.

(56) References Cited

U.S. PATENT DOCUMENTS 8,027,518 B2 * 9/2011 Baker et al. .................. 382/115
2003/0237093 A1 * 12/2003 Marsh ............................. 725/46
2012/0030586 A1 * 2/2012 Ketkar .......................... 715/751

* cited by examiner

*Primary Examiner* — Hai V Tran
(74) *Attorney, Agent, or Firm* — Brian J. Pangrle

(57) ABSTRACT

A system can include storage for identification data for individuals; an interface configured to receive image data; recognition circuitry configured to recognize individuals using received image data and stored identification data; grouping circuitry configured to define groups based on recognized individuals; assignment circuitry configured to assign media consumption preferences to defined groups; and output circuitry configured to output preferred media information based on assigned media consumption preferences of a defined group of recognized individuals. Various other apparatuses, systems, methods, etc., are also disclosed.

20 Claims, 11 Drawing Sheets

| Seating 930 | | | | | |
|---|---|---|---|---|---|
|  | S1 | S2 | S3 | S4 | S5 |
| 1st | P1 | P3 | P8 | P3 | P3 |
| 2nd | P3 | P1 | P3 | P8 |  |
| 3rd | P? |  |  |  |  |

GROUP RECOGNITION AND PROFILING

TECHNICAL FIELD

Subject matter disclosed herein generally relates to technology for recognizing groups and profiling groups.

BACKGROUND

Content consumption by a live group of individuals can occur in a home environment, an office environment, or other environment. Such forms of content consumption generally do not require input of credentials by individuals. For example, when a meeting is called in a work environment, individuals entering a meeting room normally do not need to "login" to any type of system using identifying credentials before taking a seat. Similarly, for a home environment, it would be quite burdensome and detracting to require family members to login to a content delivery system such as a cable box every time they wish to consume content. As described herein, various technologies can provide for recognition of groups that desire to consume content, or are consuming content, and optionally provide for profiling of groups, for example, to aid in selection of content.

SUMMARY

A system can include storage for identification data for individuals; an interface configured to receive image data; recognition circuitry configured to recognize individuals using received image data and stored identification data; grouping circuitry configured to define groups based on recognized individuals; assignment circuitry configured to assign media consumption preferences to defined groups; and output circuitry configured to output preferred media information based on assigned media consumption preferences of a defined group of recognized individuals. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
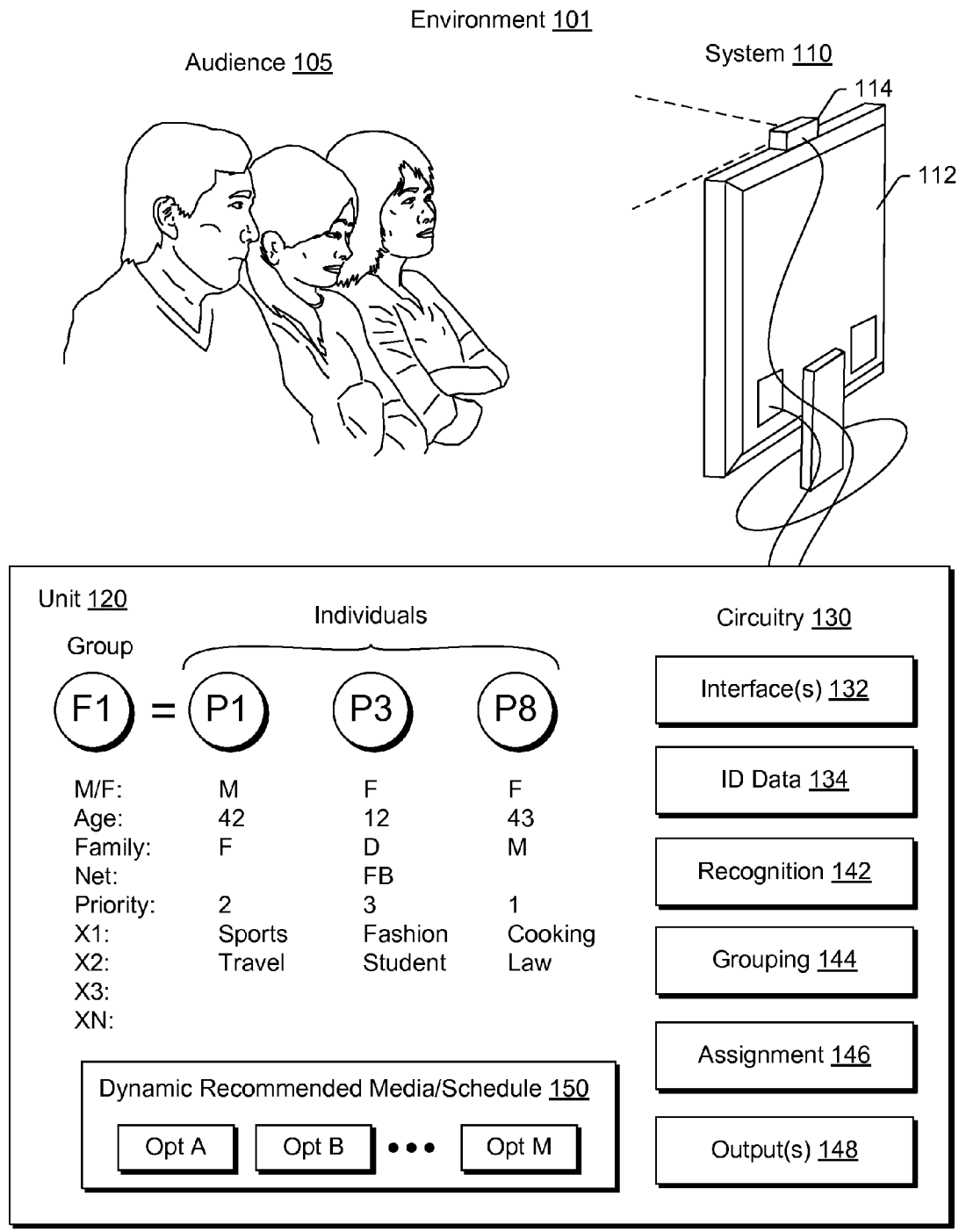
FIG. 1 is a diagram of an environment that includes an example of a system.

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

As described herein, various technologies provide for recognition of groups, for example, by receiving image data and processing such data using one or more facial recognition techniques to identify individuals that collectively define a group. As described herein, preferences for individuals or a group may be gleaned from user input, content choices, indicia of attention, or other data (e.g., a social network, a professional network, etc.). For example, a system may process image data to identify individuals that define a group, process preferences associated with the group and provide for selection of content based on the processed preferences. In such an example, processing of preferences may include weighting of some individual preferences over those of others, for example, based on age, relationship or one or more other metrics. Accordingly, in a home environment, preferences of a mother may be prioritized over those of her daughter; whereas, in a work environment, preferences of a supervisor may be prioritized over those of a subordinate (e.g., consider consumption of training videos where a supervisor's input on topics is prioritized over a subordinate's input on topics). As to social or other network data, a system may access such data (e.g., based on user or other input) and such data may include image data (e.g., a photo) of an individual (e.g., optionally for use in performing facial recognition by the system).

As described herein, a system may be configured to learn from choices made by one or more individuals whether in a group or alone. For example, such a system may identify an individual when seated alone, register commands issued by that individual to select content (e.g., via a remote control) and then store data as to the nature of the selected content (e.g., metadata associated with the content). In such an example, when the individual is seated with one or more other individuals to form a group, the registered commands, the data as to selected content, or other information may be processed, optionally together with information germane to the one or more others in the group, to determine preferred group content. Accordingly, such a system may be configured to mix or blend preferences of individuals to determine group preferences and, in turn, provide for presentation of selectable preferred content for consumption by such a group.

As described herein, a system can include storage for identification data for individuals; an interface configured to receive image data; recognition circuitry configured to recognize individuals using received image data and stored identification data; grouping circuitry configured to define groups based on recognized individuals; assignment circuitry configured to assign media consumption preferences to defined groups; and output circuitry configured to output preferred media information based on assigned media consumption preferences of a defined group of recognized individuals. In such a system, the storage for identification data for individuals may include storage for facial data, for example, as captured via a still or video camera (e.g., raw image data) or as processed for purposes of facial recognition (e.g., processed image data). With respect to receipt of image data, as described herein, a system may include a wired or a wireless interface (or both). Such an interface or interfaces may be a camera interface configured to receive still images, to receive video images, or to receive still images and video images.

As described herein, a system can include assignment circuitry configured to assign media consumption preferences to defined groups. Such assignment circuitry may include blending circuitry to blend media consumption preferences for combinations of individuals and, optionally, combinations of defined groups. For example, if media consumption preferences are available for group A and group B, given a group C, that includes at least some individuals of group A and at least some individuals of group B, such blending circuitry may appropriately blend the preferences of group A and group B to arrive at preferences for group C. Consider as an example a scenario where group A likes actor X and group B likes actor Y, the preferences for group C may be films or TV shows that include both actor X and actor Y. As described herein, a system may include location circuitry for spatially locating recognized individuals. Further, such circuitry may optionally be configured to locate recognized individuals in an environment where the environment is characterized by, for example, a room, furniture, time of day, time zone, natural lighting, artificial lighting, noise, neighborhood, address, room size, temperature, humidity, etc. As an example, consider a group composed of a husband and a wife that watches romantic movies every Thursday night with the lights turned off. In such an example, if the circuitry determines that the lights are not turned off on Thursday night, this environmental condition may be taken into account (e.g., do not recommend or recommend at least some alternatives to romantic movies as environmental conditions are not met).

As described herein, location circuitry for spatially locating one or more recognized individuals can optionally include circuitry for locating individuals with respect to each other. For example, if a family sits on a sofa in a usual order night-after-night, a detected change in the order may impact preferences for the group. In other words, a change to a usual seating arrangement may indicate that something changed in dynamics of the group that could alter preferences of the group. Data collection may be triggered by such a change to facilitate learning to determine whether preferences have changed and what they changed to. More generally, as described herein, assignment circuitry may be configured to assign media consumption preferences to defined groups in a manner that accounts for location of individuals with respect to each other in a defined group. As described herein, assignment circuitry may be configured to assign media consumption preferences to defined groups using circuitry configured to access one or more remote databases that include media information (e.g., movie databases, channel line-up databases, etc.).

As to recognition circuitry, in various examples, such circuitry may be or include facial recognition circuitry. As described herein, a system may optionally include circuitry for locating a remote control and, for example, associating a remote control with an individual. With respect to a remote control, a system may be configured to determine a direction of a signal issued by a remote control and associate that direction with image data, seating data, etc., to determine the holder of the remote control (e.g., which individual in a group has the remote control). In instances where more than one remote control is in use, a system may be configured to determine which individual or individuals are issuing commands via the multiple remote controls. As described herein, possession of a remote control may alter status of an individual (e.g., prioritize that individual's preferences over one or more others in a group).

As to input circuitry, such circuitry may be configured to receive any of a variety of input (e.g., input of information for individuals, input of information for groups of individuals, etc.). As to output circuitry, such circuitry may be configured to output media information based on assigned media consumption preferences of a defined group of recognized individuals, for example, via an output interface configured to output selectable preferred media to render to a screen for consumption by the defined group.

As described herein, a method can include identifying a group of individuals located in front of a screen using a camera and facial recognition circuitry; associating the group with media consumption preferences; and, based on the associating, determining selectable preferred media choices to be rendered to the screen. Such a method may optionally include identifying a new group of individuals located in front of the screen; associating the new group with media consumption preferences; and, based on the associating, determining selectable preferred media choices to be rendered to the screen. As described herein, a method can include, based on associating a group with media consumption preferences, automatically calling for preferred media to be rendered to the screen for consumption by the group (e.g., issuing a command signal, directing information to a screen buffer, etc.).

As described herein, one or more computer-readable media can include computer-executable instructions to instruct a computing system to: define a group based on a list of individuals; assign media consumption preferences to defined groups of individuals; and, responsive to recognition of individuals that define a group, output preferred media choices, the preferred media choices selectable, via a graphical user interface, for rendering to a display for consumption by the group. Such one or more media may include computer-executable instructions to instruct a computing system to receive media selections from a group and, based thereon, to assign revised media consumption preferences to the group. As described herein, one or more computer-readable media can include computer-executable instructions to instruct a computing system to restrict preferred media choices for a group based on age of an individual in a list of individuals that define the group.

Various examples are described herein that pertain to content consumption (e.g., media consumption) in environments such as a home environment, office environment, etc. As to conventional media delivery systems (e.g., via a TV, a PC, etc.), they do not consider viewer face recognition and context as input to decide how to delivery content or what content to deliver. Such conventional systems also lack an ability to pause rendering of content, an ability to deal with multiple people in a room, etc.

As described herein, various technologies can delight users consuming content by automatically creating a profile and learning preferences based on, for example, face recognition, like/dislike history and social dynamics. Consider an example where a system automatically creates or selects a user's profile by scanning a picture of the primary user or a group of people in a room. To create a profile a camera associated with the system (e.g., a camera associated with a TV or PC) can take a picture of the user, which may serve as a basis for identifying the user (e.g., as raw image data, processed image date, etc.) and which may be the user's ID. To maintain such a user ID, every time a user uses the system (e.g., TV or PC), the system can be configured to take a new picture and compare the new picture to one or more other pictures (e.g., raw or processed) in a database of the system. Upon comparison, if there is a user ID match, then the system may be configured to store the new picture as a main user ID and optionally keep the old picture in its database for future cross reference. Responsive to recognition or identification, the system can access and load preferences for the user (e.g., user's profile preferences). In instances where a system is not absolutely certain as to a user's ID (e.g., uncertain ID match), then the system may be configured to rely on other information or take other action. As an example, a system may prompt a user to select a profile (e.g., from various profiles rendered to a display) or to simply create a new profile. As another example, a system may prompt a user to select her user ID from two or more IDs that have less uncertainty (e.g., close matches).

As described herein, a system may be configured to store information for facial identifications as metadata associated with an image or images, for example, to be able to import user preferences easily, such as when a user desires to upgrade a TV or PC (or one or more associated components). As an example, such metadata and image or images may be stored locally or remotely where a new or upgraded system (or component thereof) can access the storage.

As described herein, a system can include circuitry for tracking and learning, for example, to modify a user profile or a group profile over time. Such circuitry may be automatically implemented responsive to user input or identification of one or more individuals, whether a user ID exists for each individual or not. As described herein, once a profile is created, a system can be configured to track user likes and dislikes. Further, to build a history, a system may optionally be configured to prompt a user to determine if she likes or dislikes a particular show or channel, for example, at play time, during a commercial, during display of a channel line-up, etc.

As described herein, a system may be configured to analyze a show or channel properties. For example, a system may be configured to determine properties such as content rating, first air time, release date, type of content, language, etc. Such determined properties may be analyzed to recommend or add shows that align with a user's preferences or a group's preferences. At the time of profile creation, a system may be configured to allow a user or a group of users to select preferences to guide profile building while the system learns individual, group or individual and group likes, dislikes, etc. For example, if a user makes a selection that indicate that he likes sports and movies, a system may analyze such information and respond by "hiding" channels that do not have sports or movies at the current time (e.g., creating a channel line-up that matches his preferences). Accordingly, as the user channel surfs, he will only see channels with sports or movies. Such a system can continue learning over time as to likes and dislikes of the user, alone or in a group or groups, and may refine preferences (e.g., for the user alone or in a group).

As described herein, face tracking circuitry can be configured to provide context, for example, by recognizing a user's behavior or group dynamics. As an example, a system may be configured to identify a person holding a remote and label that person as the primary user. In turn, system circuitry may track or analyze behaviors of that user in a "heightened" manner (e.g., higher resolution, receive more input details, assigning priority to actions of that user, etc.) compared to one or more others that may be within a field of view with respect to tracking circuitry (e.g., a camera, etc.).

In instances where individuals arrive before a system (e.g., within a field of view before a display), a system may act to acquire or receive image data and attempt to identify each of the individuals by cross checking image data with, for example, an ID image (e.g., raw or processed data) in a database of the system. Where an individual cannot be matched because he is not in the database, then the system may be configured to prompt the individual for preferences or, if ignored, the system may use preferences of one or more other users (e.g., individual preferences, group preferences, primary user preferences, etc.). A system may optionally include circuitry configured to access a social or other network of one or more individuals and to acquire data (e.g., image or other data) in an effort to recognize an individual. For example, if a social network entry for Sue includes photos of friends Mark and Jim, a system may compare locally acquired image data to image data (e.g., photos) for Mark and Jim as acquired from the social network in an effort to determine if Mark or Jim is an individual of a group (e.g., seated in a local environment).

As described herein, for instances where multiple individuals have existing profiles with differing preferences, then a system may be configured to combine their likes and dislikes to create a master profile for the group of individuals (e.g., in a room or otherwise in a field of view). For example, a primary user's sports and movies profile may be merged with his son's cartoon and educational profile and the wife's reality TV and cooking profile. Accordingly, such a system can be configured to track this group's likes and dislikes and store preference information as part of their group profile.

As described herein, where a group profile is created, circuitry may be configured to track individuals in a room to determine social dynamics context to act. A system may be configured to offer a primary user (e.g., super user) options for action, for example, where the primary user dictates a majority of actions for a group.

As an example of social dynamics context, consider a system configured with face recognition circuitry that can determine if people are paying attention (e.g., angle of head, eyes shut, etc.). If not, the system may be configured to respond by calling for rendering to a display alternative entertainment or options. As another example, consider individuals having a conversation and not looking toward a display. Given such a scenario, a system may respond by automatically pausing a movie or show, by automatically increasing (or decreasing) volume of the system, by automatically offering other shows or issuing a visual or audible prompt to record the content (e.g., via DVR) for later viewing.

As an example, consider a scenario where one or more individuals fall asleep within a field of view before a system. In such a scenario, the system may identify which individual or individuals are asleep. For example, if the system identifies Jane and determines that Jane is asleep (e.g. via change in eye size, lack of movement, etc.), the system may associate such a determination with a time relative to content being rendered to a display (e.g., Jane only saw the first 30 minutes of the movie). In turn, this information may be stored by the system in association with Jane's profile or, more generally, Jane's information. Accordingly, when the Jane enters the field of view on a subsequent occasion and the system identifies Jane, the system may access that portion of stored information and, automatically or upon issuance of a prompt, allow Jane to consume the content beginning from a point in time (or just before, e.g., a delta of about 10 minutes prior) that the system determined that she fell asleep. Accordingly, the next time Jane begins a viewing session (e.g., watching a TV), the system may issue a prompt that allows her to resuming viewing the content (e.g., movie, show, etc.) from where she was likely to have stopped viewing.

As described herein, a system may be configured to determine some measure or measures as to boredom or not paying attention to content being rendered. In response to such a determination, the system may, for example, pause and recommend other content for consumption.

As described herein, a system may be configured to determine when an individual or individuals leave a field of view (e.g., a room). In response to a determination that an individual has exited a field of view, the system may pause rendering of content (e.g., whether to a display, to speakers, or both). Such a determination may account for particular aspects of an individual or a group (e.g., a primary user versus a lower ranked user). As an example, such a system could pause a movie when an individual takes a bathroom break (e.g., walks out of the room) or, if there are multiple individuals in the room, when one leaves, the system may respond by offering alternatives, such as pause, keep going or change channel until the individual returns (e.g., to be identified by the system).

As described herein, by tracking individuals in a field of view (e.g., a room) and actions taken (e.g., consider foregoing examples), a system can learn and establish contextual footprints, which may be relied on in the future (e.g., for the same individuals whether in the same group or different groups).

FIG. 1 shows an environment 101 that includes an audience 105 and a system 110. The system 110 includes a display 112, a camera 114 and a unit 120. The display 112 may include speakers and the camera 114 may be fixed or may be configured to perform one or more actions such as pan, tilt, zoom. As described herein, a system may include any of a variety of equipment capable of sensing or gathering information as to an environment (e.g., temperature sensor, microphone, motion sensor, etc.).

In the example of FIG. 1, the unit 120 includes circuitry 130. For example, the circuitry 130 may be configured as one or more interfaces 132, as storage or handling routines for ID data 134, as recognition techniques for individuals 142, as grouping techniques for grouping individuals 144, as assignment techniques for assigning preferences to groups 146, and as one or more outputs to output preferred information 148 (e.g. based at least in part on preferences).

Some characteristics of the circuitry 130 of the unit 120 may be explained with respect to the audience 105, which includes three individuals. As shown, the individuals of the audience 105 are within a field of view of the camera 114. The unit 120 receives image data from the camera via at least one of the interfaces 132. In turn, recognition circuitry 142 processes the image data with reference to the ID data 134, which results in recognition of users P1, P3 and P8. As described herein, ID data 134 can include preference data, which may optionally allow for enhanced recognition of an individual based on both image data and preference data (e.g., behavior). Some examples of preference data associated with the users P1, P3 and P8 are shown in a table format and include gender, age, family, network membership (e.g., social network such as the FACEBOOK® network), priority (e.g., hierarchy in group), likes, and occupation. Once the unit 120 has recognized the individuals, the grouping circuitry 144 can define the group (e.g., Group F1). Further, the assignment circuitry 146 can assign media consumption preferences to the defined group (e.g., based on individual preferences and optionally other information). Given the media consumption preferences, the output circuitry 148 can output preferred media information based on the assigned media consumption preferences of the defined group of recognized individuals. In the example of FIG. 1, the preferred media information may be in the form of a dynamic recommended media schedule or options 150. Such information may be configured and directed to a buffer for rendering to the display 112. In turn, one or more members of the audience 105 may make select media from the schedule or options 150 (e.g., options A, B, . . . M). As an alternative, the system 110 may be configured to automatically select and render media based at least in part on preferences.

Figure 2:
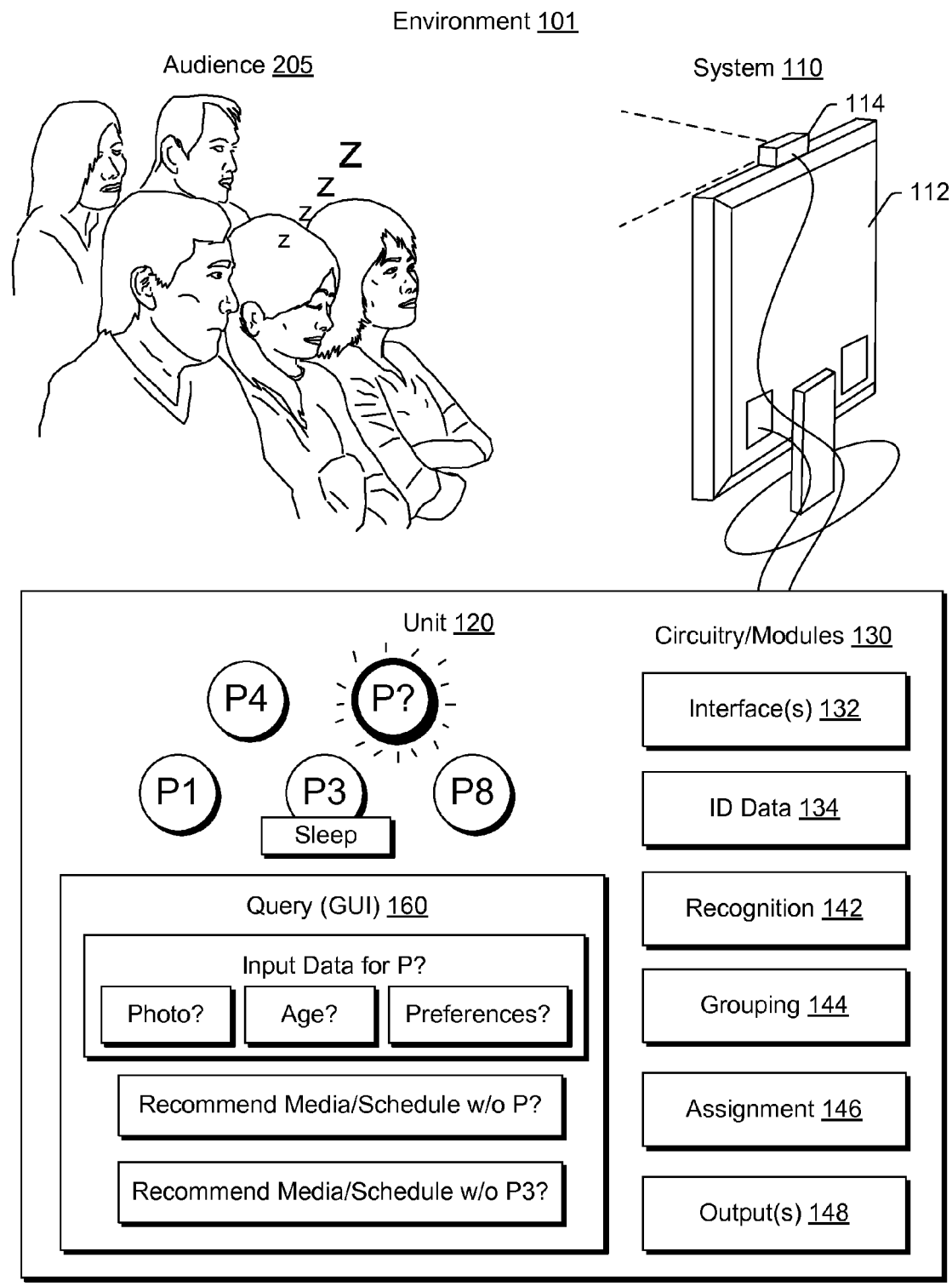
FIG. 2 is a diagram of an environment that includes the system of FIG. 1.

FIG. 2 shows the environment 101 and the system 110 of FIG. 1, however, a different audience 205 now appears within the field of view of the camera 114. As indicated, the unit 120 recognizes individual P4 and recognizes that the individual P3 is asleep, however, the unit 120 is uncertain as to the identity of one of the individuals in the audience 205 ("P?"). In response, the unit 120 calls for rendering of a graphical user interface (GUI) query 160 that is configured with control graphics to input data for the unidentified individual and optionally configured with a control graphic to ignore identity of the individual and optionally configured with a control graphic to ignore the sleeping individual P3. With respect to the sleeping individual P3, the recognition circuitry 142 may be configured to identify eyes and aspects of eyes to determine whether an individual is paying attention, awake, asleep, etc.

Figure 3:
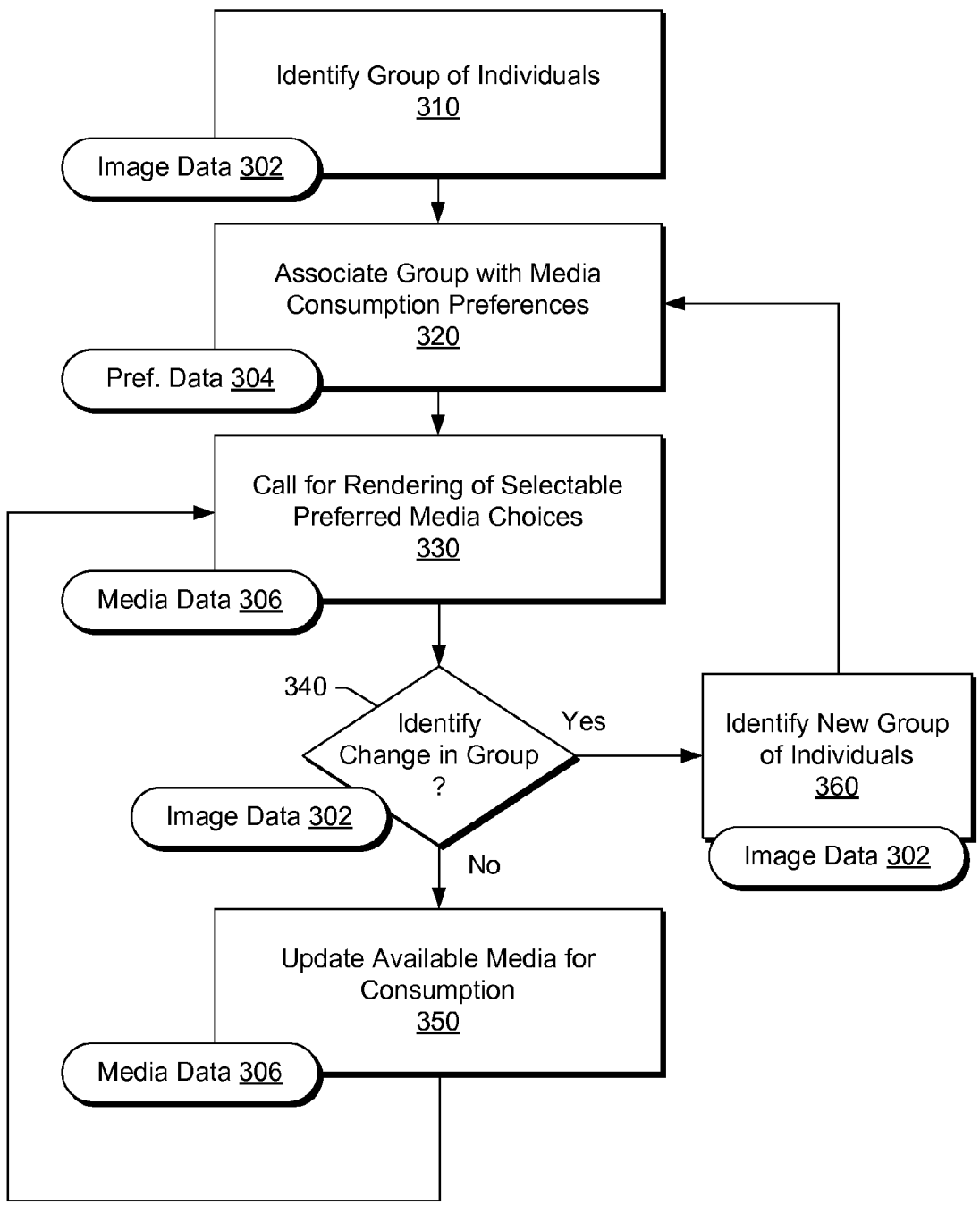
FIG. 3 is a diagram of an example of a method.

FIG. 3 shows a block diagram of an example of a method 300. The method 300 includes an identification block 310 that identifies a group of individuals, for example, based at least in part on image data 302; an association block 320 associated a group with media consumption preferences, for example, based at least in part on preference data 304; and a call block 330 that calls for rendering of selectable media choices, for example, based at least in part on media data 306 (e.g., as acquired by a media provider, a database, etc.).

The method 300 further includes a decision block 340, which decides whether identification of a change in a group has occurred, for example, based at least in part on image data 302. For the example of FIG. 3, if the decision block 340 decides that no change has occurred (e.g., "No" branch), the method 300 continues at an update block 350 that updates available media for consumption, for example, based at least in part on media data 306. Subsequently, the method 300 may continue at the call block 330. However, if the decision block 340 decides that a change has occurred (e.g., "Yes" branch), the method 300 continues at an identification block 360 that identifies a new group of individuals, for example, based at least in part on image data 302. Thereafter, the method 300 may continue at the association block 320. As shown in the example of FIG. 3, a method can respond to a change in a group and update available media for consumption, which may be preferred media and presented to a group as preferred media choices (e.g., selectable preferred media choices).

As described herein, a method can include identifying a group of individuals located in front of a screen using a camera and facial recognition circuitry; associating the group with media consumption preferences; and, based on the associating, rendering selectable preferred media choices to the screen. Such a method may include identifying a new group of individuals located in front of the screen; associating the new group with media consumption preferences; and, based on the associating, rendering selectable preferred media choices to the screen. As described herein, a method can include, based on associating, automatically rendering preferred media to a screen for consumption by a group.

Figure 4:
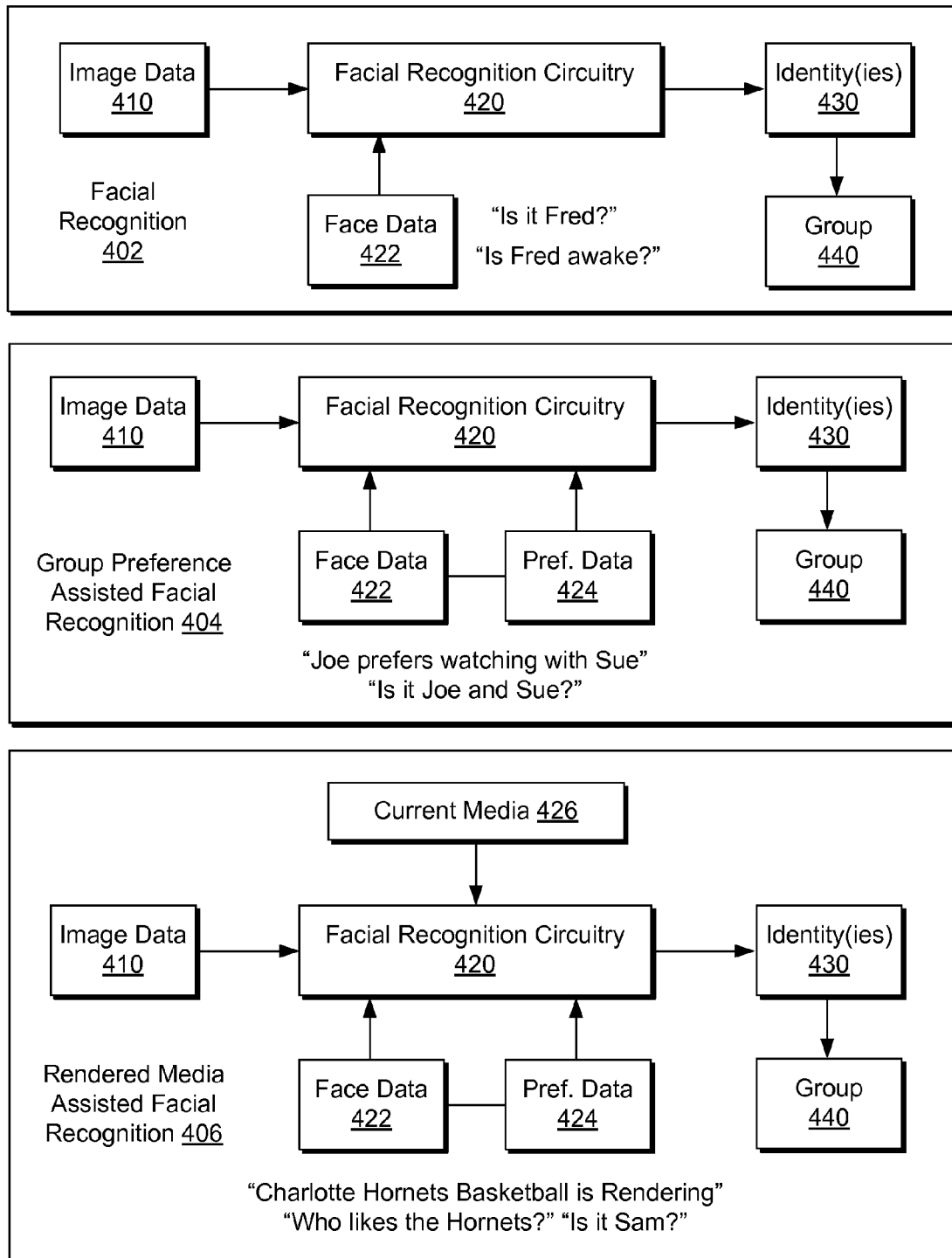
FIG. 4 is a series of diagrams of examples schemes.

FIG. 4 shows various recognition schemes, including a facial recognition scheme 402, a group preference assisted facial recognition scheme 404 and a rendered media assisted facial recognition scheme 406. The scheme 402 involves image data 410 being received by facial recognition circuitry 420 as assisted by face data 422 to provide for one or more identities 430, which may then be used to define a group 440. Such a scheme may be configured to make determinations as to identity of an individual, as to whether an individual is asleep, etc.

As to the scheme 404, preference data 424 are included and available as input to the recognition circuitry 420. Such a scheme may be configured to make determinations as to identity of an individual based at least in part on preference data. For example, if Joe prefers watching TV with Sue, once Joe or Sue have been recognized and identified, the other may be more readily identified using preference data (e.g., to reduce uncertainty).

As to the scheme 406, preference data 424 and current media are included and available as input to the recognition circuitry 420. Such a scheme may be configured to make determinations as to identity of an individual based at least in part on preference data and current media. For example, if current media is "Charlotte Hornets basketball", the recognition circuitry 420 may pose a query as to "Who likes the Hornets?" (e.g., as a preference data search). In turn, the recognition circuitry 420 may only rely on face data 422 that is associated with those that like the Hornets (e.g., those with an associated preference for Hornets basketball). In the example of FIG. 4, "Sam" is considered as having preference data 424 that indicates a preference for Hornets basketball. Accordingly, the image data 410 as received by the recognition circuitry 420 may be analyzed with respect to a limited set of the face data 422 that includes face data of Sam.

Figure 5:
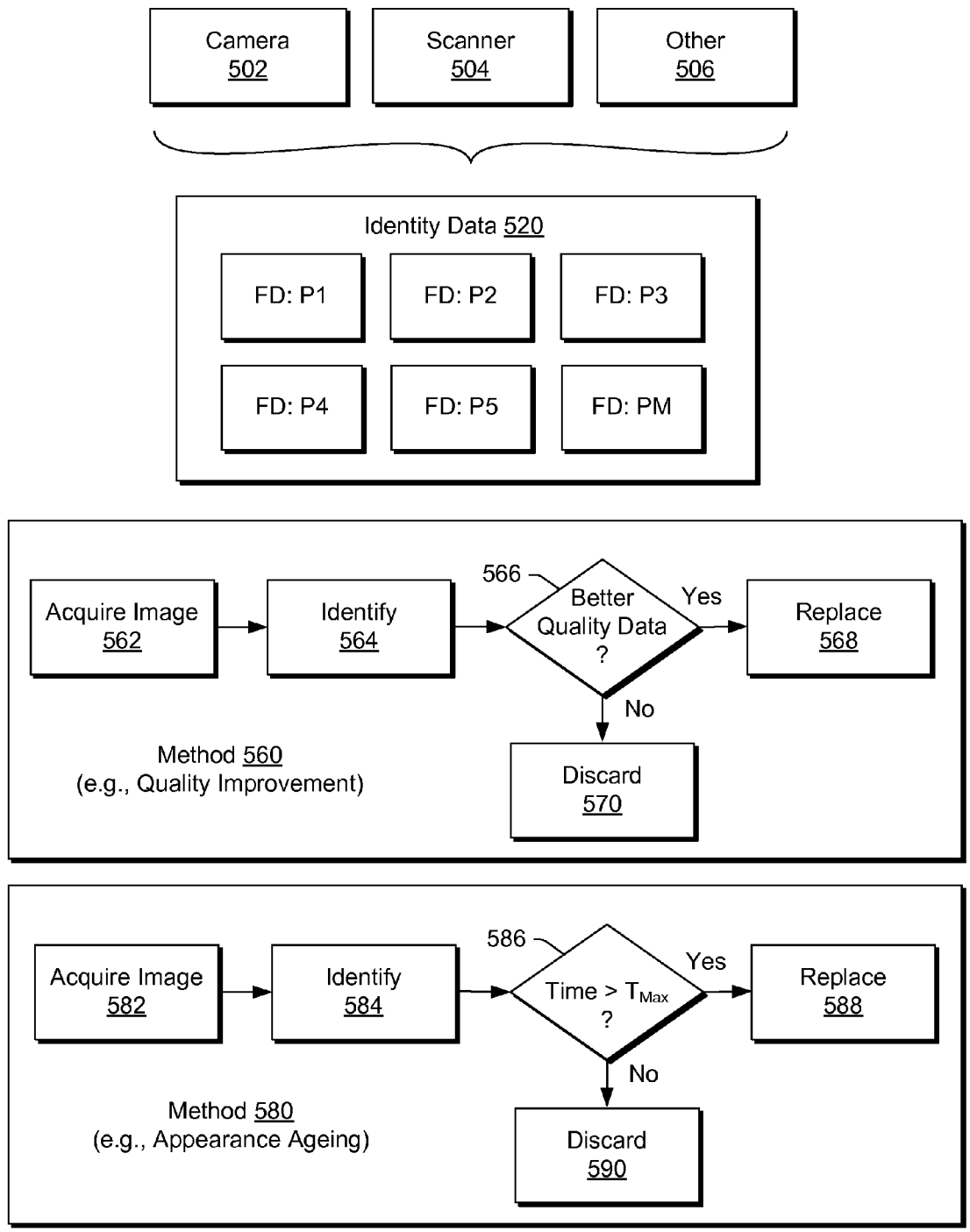
FIG. 5 is a series of diagrams of examples of methods.

FIG. 5 shows examples of methods, specifically a method 560 for quality improvement of data and a method 580 that accounts for changes in appearance such as changes due to ageing.

As described herein, identity data 520 may be acquired using any of a variety of sources such as a camera 502, a scanner 504, or other 506. Identity data 520 may be organized as face data for individuals, for example, having monikers P1, P2, P3, P4, P5, . . . PM.

As shown, the method 560 includes an acquisition block 562 for acquiring image data, an identification block 564 for identifying an individual based at least in part on acquired image data, and a decision block 566 that decides whether the acquired image data represents an improvement in data quality for the identified individual (e.g., resolution, contrast, etc.). As indicated, if the decision block 566 decides that the image data does not represent an improvement in quality, the method 560 continues to a discard block 570 that discards the image data (e.g., or marks for deletion, etc.). Alternatively, if the decision block 566 decides that the image data provides an improvement in quality, the method 560 continues to a replacement block 568 that replaces existing data or otherwise supplements existing data to improve quality.

As shown, the method 580 includes an acquisition block 582 for acquiring image data, an identification block 584 for identifying an individual based at least in part on acquired image data, and a decision block 586 that decides whether a time has exceeded a value of a time parameter (e.g., maximum data lifetime, delta with respect to stored image data for that individual, etc.). As indicated, if the decision block 586 decides that a time associated with the image data is not greater than the value of the time parameter, the method 580 continues to a discard block 590 that discards the image data (e.g., or marks for deletion, etc.). Alternatively, if the decision block 586 decides that the image data has an associated time that exceeds the value of the time parameter, the method 580 continues to a replacement block 588 that replaces existing data or otherwise supplements existing data. As an example, the time parameter may be "X days", "Y weeks", etc., such that fresh image data is available such that ageing or other changes in appearance do not diminish probability of identifying an individual.

Figure 6:
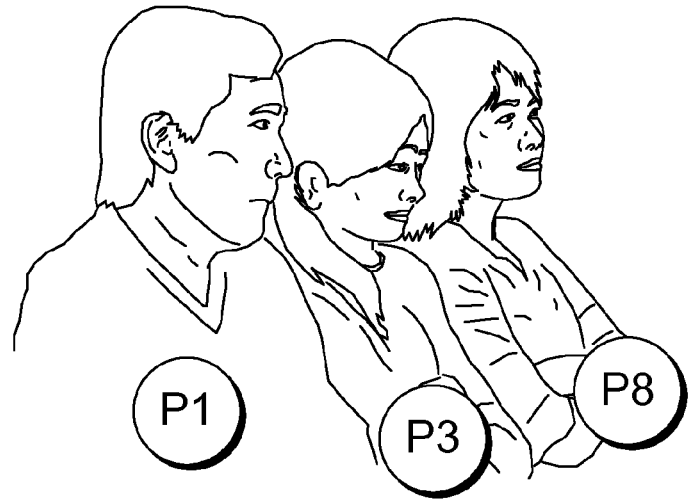
FIG. 6 is a diagram of an example of a graphical user interface and associated schemes.

FIG. 6 shows an example of a graphical user interface (GUI) 610 configured to allow a user to select options with respect to "order" of individuals in an audience 605 (e.g., or, more generally, arrangement of individuals). In the example of FIG. 6, the GUI 610 includes a selectable graphic control to "Ignore Order" and a selectable graphic control to "Consider Order". Given the individuals P1, P3 and P8, definable groups that ignore order are shown as G:138, G:13, G:18 and G:38. However, if order is considered, the number of definable groups increases. For example, for three-member groups, the number of possible groups is 6 (3!=3*2*1=6). As described herein, a system may rely on order information to make determinations as to content for a group of individuals.

Figure 7:
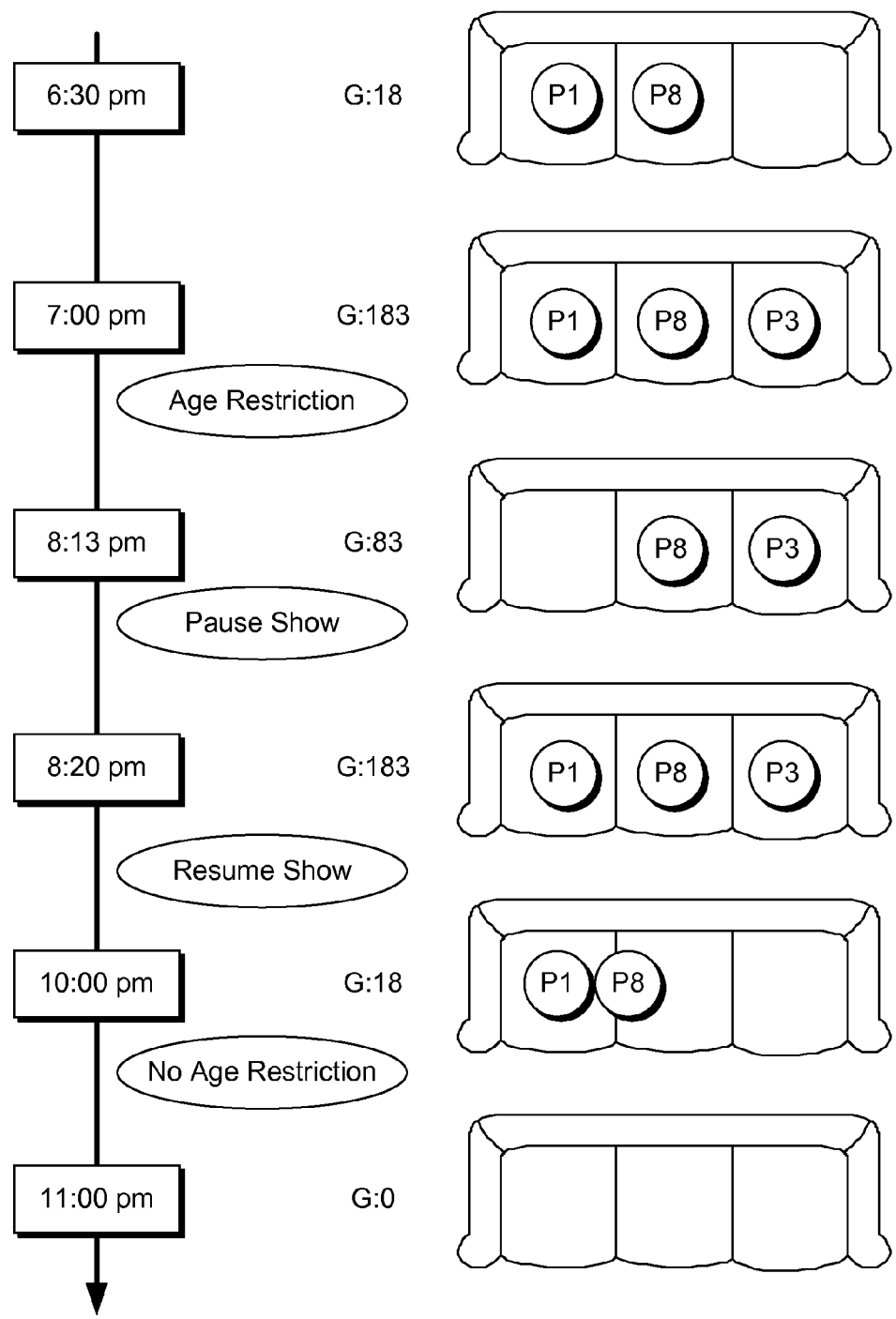
FIG. 7 is a diagram of an example of changes in an environment and responses of a system thereto.

FIG. 7 shows an example of how a system may respond to changes in an audience. The example is described with respect to a timeline, a sofa and individuals P1, P3 and P8. At time 6:30 pm, the system identifies P1 and P8 as group G:18. At time 7:00 pm, the system identifies P1, P8 and P3 as group G:183. As P3 is of a certain age, the system automatically restricts content. For example, the system may have access to ratings such as G, GP, GP-13, R and NC-17 and, based on the age of the individual P3, the system may prevent rendering of media having a rating R or NC-17. At time 8:13 pm, the system recognizes that P1 has left the sofa and, in response, the system pauses media delivery (e.g., rendering). At time 8:20, the system recognizes that P1 has returned to the sofa and, in response, the system resumes media delivery. At time 10:00 pm, the system recognizes that P3 has left the sofa and optionally that a spatial distance between P1 and P8 has diminished. In response, the system releases the age restriction that was imposed at 7:00 pm. Further, the system may optionally recommend romantic media as the proximity of P1 and P8 may be indicative of a romantic context. At time 11:00 pm, the system recognizes that no individuals are present on the sofa. In response, the system may shut down, enter a low energy usage state, etc. As described herein, a motion sensor, which may be a camera or other type of sensor, may optionally be active and configured to "wake-up" a system if motion is detected (e.g., to being acquiring image data, recognizing individuals based on image data, etc.).

Figure 8:
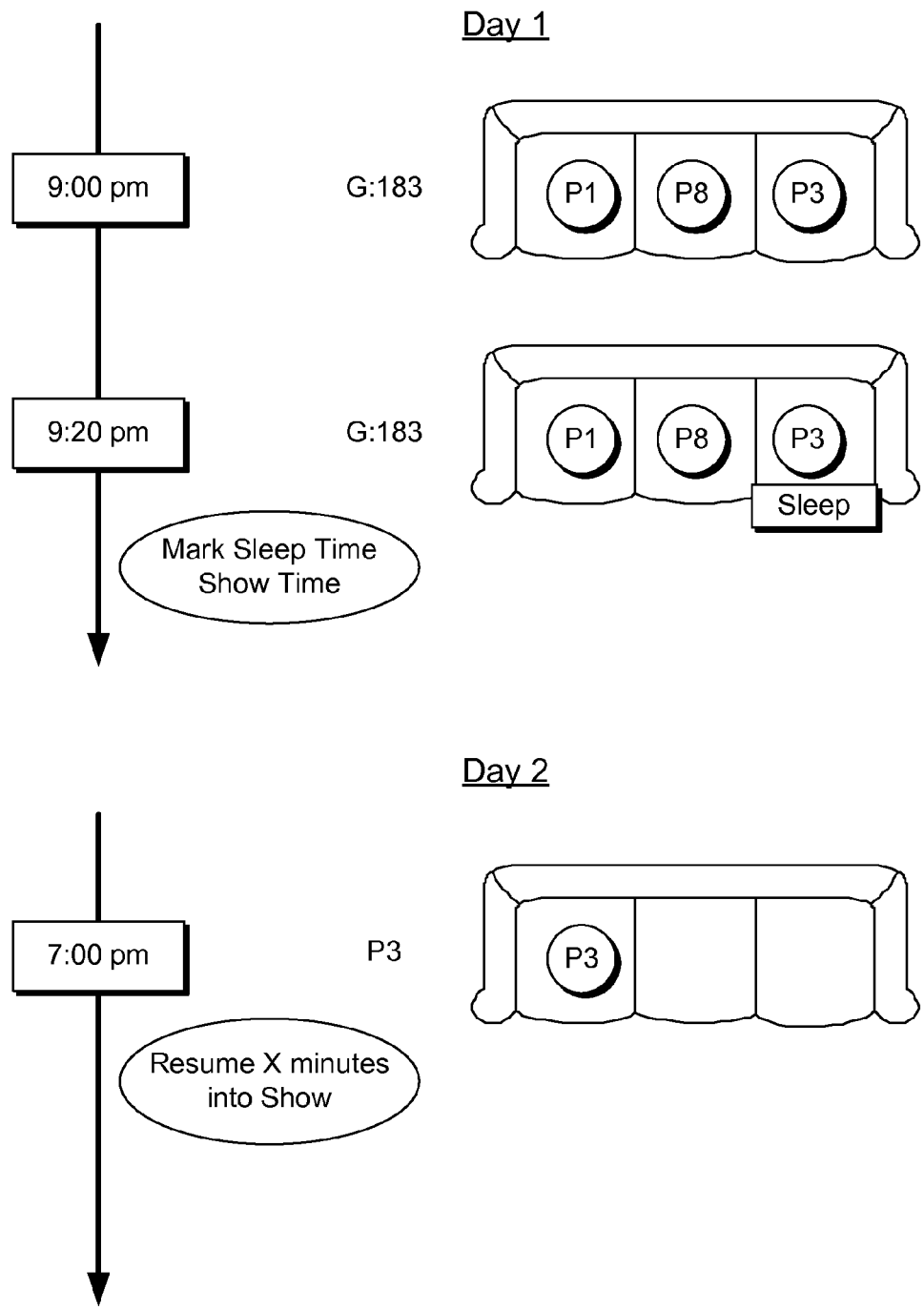
FIG. 8 is a diagram of an example of changes in an environment and responses of a system thereto.

FIG. 8 shows an example of how a system may respond to changes in individuals in an audience. The example is described with respect to a timeline, a sofa and individuals P1, P3 and P8. At time 9:00 pm on Day 1, the system identifies individuals P1, P8 and P3 as group G:183. At 9:20 pm on Day 1, the system identifies individual P3 as being asleep. In response, the system stores the sleep time, optionally with reference to a start time of media being rendered at the time sleep was noted. In such a manner, the system can determine, for example, that P3 fell asleep X minutes into a show. As shown, at 7:00 pm on Day 2, the system identifies the individual P3 as seated on the sofa and, in response, can automatically issue a command to resume rendering of the show at the approximate time that P3 fell asleep. As mentioned, a system may include a time parameter that causes resumption of media a number of minutes earlier than a noted sleep time. Further, as mentioned, a system may provide merely an option to resume rendering (e.g., as opposed to automatically resuming).

Figure 9:
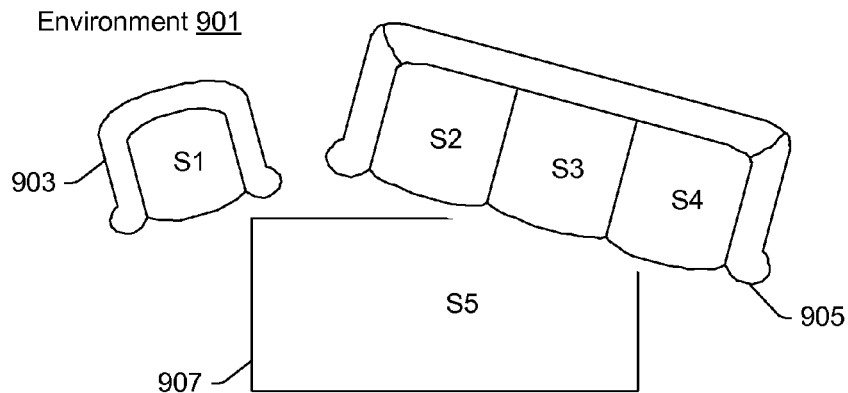
FIG. 9 is a diagram of an environment and an example of a system.
Figure 9:
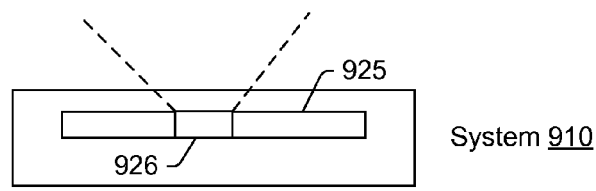
Figure 9:
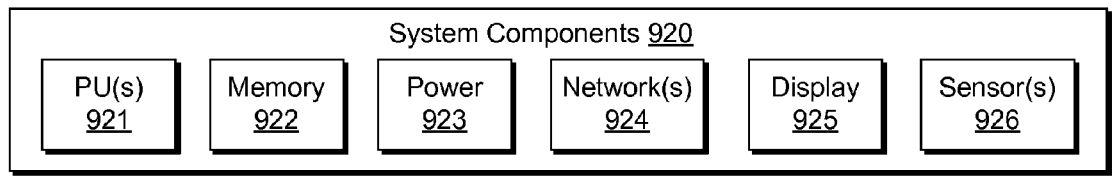
Figure 9:
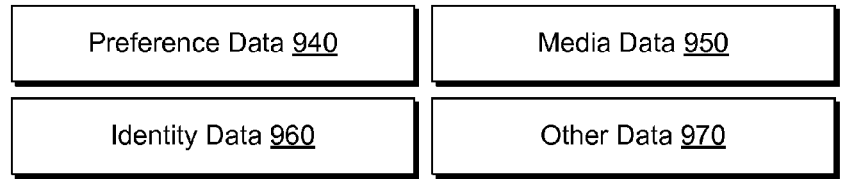

FIG. 9 shows an example of an environment 901 that includes a chair 902, a sofa 905 and a rug 907, which may be considered as seating options, as well as a system 910 that includes a display 925 and one or more sensors 926. As shown, the one or more sensors 926 can achieve a viewing angle or field of view (e.g., via lens, zoom, tilt, pan, etc.) sufficient to acquire information as to individuals that may be seated at one of the seating options (e.g., order or arrangement of individuals).

In the example of FIG. 9, the system 910 includes various system components 920. Such components may include one or more processing units (PU) 921, memory 922, power 923, one or more network interfaces 924, the display 925 and one or more sensors 926.

Also shown in FIG. 9 is a seating table 930. As described herein, a system may include seating information that associated individuals with seating. Such information may provide for priorities, frequencies or probabilities that relate individuals to various seating options. For example, for seating option 51 (the chair 903), P1 is the most likely occupant followed by P3 and an unknown individual P?. Similarly, for seating option S5 (the rug 907), P3 is the most likely occupant.

As described herein, seating information may be linked to or part of preference data 940. Seating information may be stored as being specific to an environment, stored as being pertinent to one or more individuals, or both. As described herein, the system 910 may rely on the seating information 930, the preference data 940, media data 950, identity data 960 and optionally other data to make determinations as to content consumption options for individuals, whether viewing alone or in a group.

Figure 10:
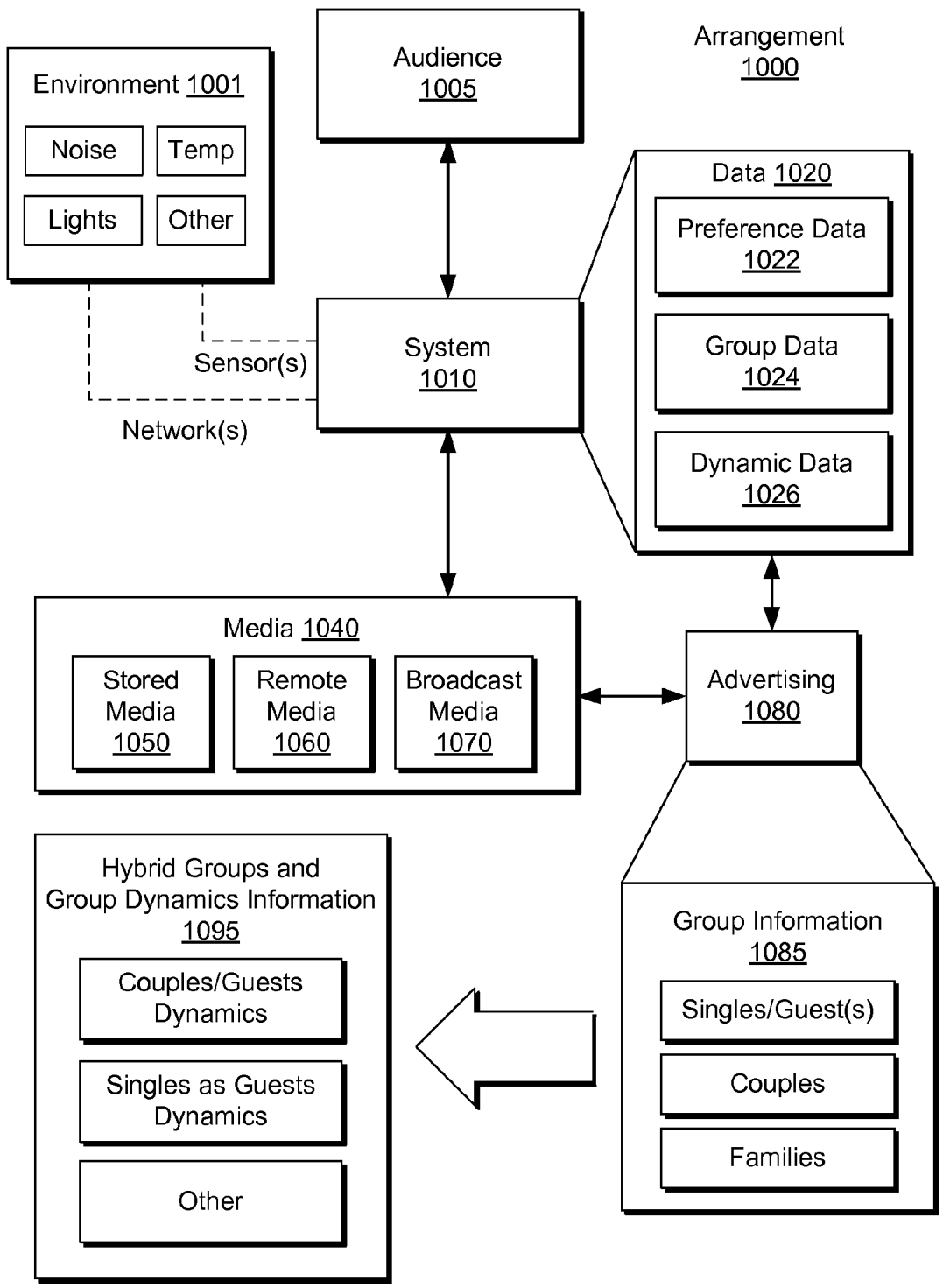
FIG. 10 is a diagram of an example of an arrangement that includes advertising.

FIG. 10 shows an example of an arrangement 1000 that includes an environment 1001, an audience 1005, a system 1010, data 1020, media 1040, advertising 1080, group information 1085 and hybrid group and group dynamics information 1095.

Various arrows illustrate some examples of how the various components of the arrangement 1000 may interact. For example, the system 1010 can receive environmental information via one or more sensors, one or more networks, etc. Such information may include noise, temperature, lighting, or other information. The system 1010 can also include or be configured to receive image data to assist with recognition of individuals in the audience 1005. As described herein, recognition may rely on the data 1020, which may include preference data 1022, group data 1024 or dynamic data 1026 (e.g., environment dynamics, group dynamics, media dynamics, etc.).

As indicated, the data 1020 may be linked with the advertising 1080 and the advertising 1080 may be linked with the media 1040, which is illustrated as including stored media 1050 (e.g., stored locally), remote media 1060 (e.g., stored remotely) and broadcast media 1070 (e.g., remote live or stored data). Such media may be deliverable via satellite, cellular network, cable network, etc. Accordingly, the system 1010 may include one or more interfaces configured for receipt of media 1040.

As described herein, the advertising 1080 may be linked with the group information 1085, which may include information categorized as, for example, "singles/guests", "couples" and "families". As another example, a social network group of friends or a work group of colleagues may be considered as categories. As shown, the arrangement 1000 may acquire information and process information pertaining to groups and, when such information is combined with advertising, optionally responses to advertisements, it may be possible to derive information as to hybrid groups and group dynamics 1095. As shown in FIG. 10, the hybrid groups and group dynamics information 1095 can include information as to couples/guests dynamics, singles as guests dynamics or other group-related dynamics. In other words, the arrangement 1000 can provide advertisers with rich data as to group dynamics for particular types of groups as well as hybrid groups. Advertisers may rely on such data to improve advertising associated with the media 1040. For example, advertisers may rely on such data to improve advertising to families, to families that have a single individual as a guest (e.g., someone that may not live with a family), to families that have a couple as guests, to couples that have a single individual as a guest, to couples that have another couple as guests, to members of a social network group, to members of a professional network group, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 11:
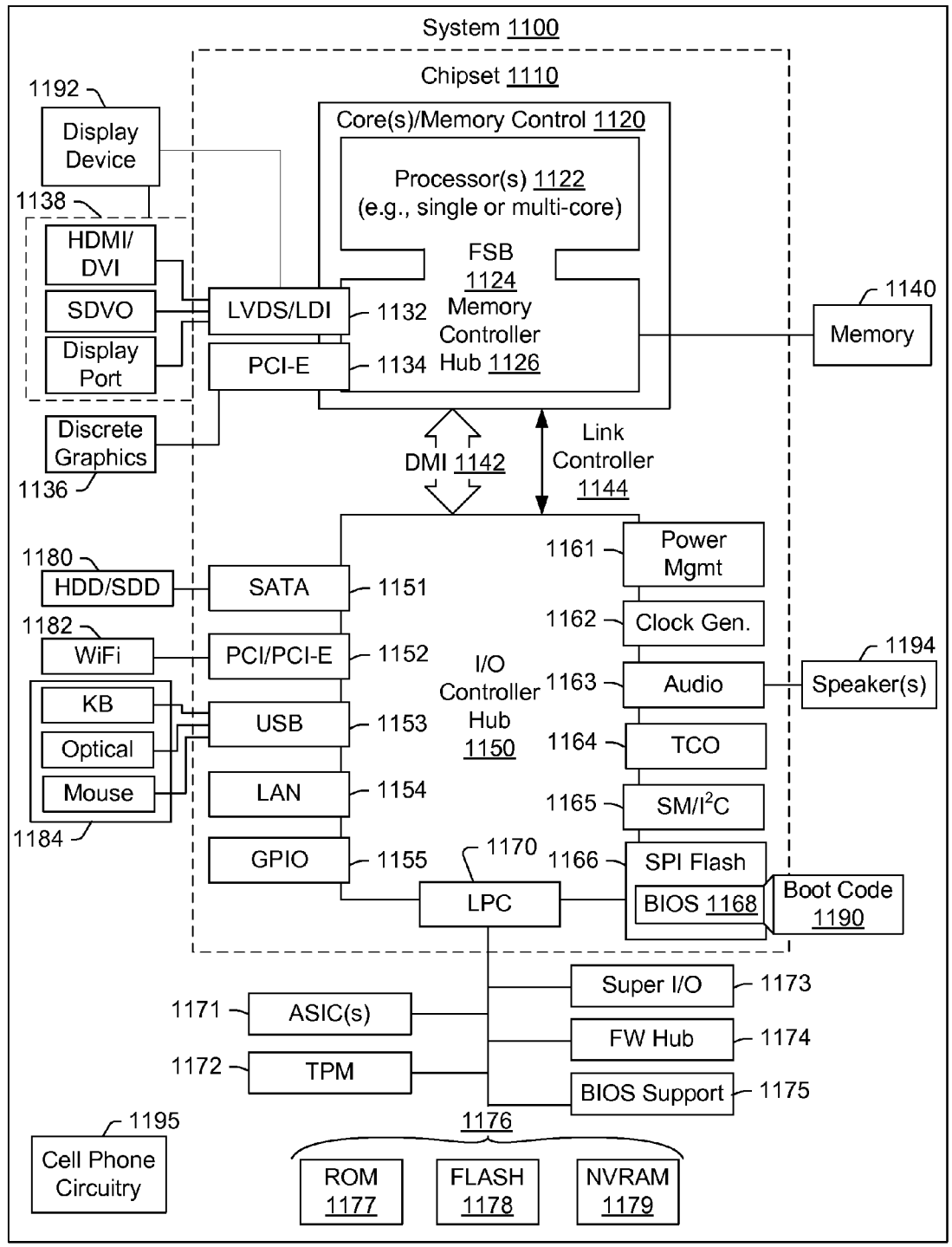
FIG. 11 is a diagram of an example of a machine.

While various examples of circuits or circuitry have been discussed, FIG. 11 depicts a block diagram of an illustrative computer system 1100. The system 1100 may be a desktop computer system, such as one of the ThinkCentre® or ThinkPad®series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100. As described herein, a unit such as the unit 120 of FIG. 1 may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors (see, e.g., the sensors 926 of FIG. 9), mice and various other devices (e.g., microphones, cameras, phones, storage, media players, etc.). On or more other types of sensors may optionally rely on the USB interface 1153 or another interface (e.g., I$^2$C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
   storage for identification data for individuals;
   an interface configured to receive image data;
   recognition circuitry configured to recognize individuals using received image data and stored identification data;
   location circuitry configured to spatially locate recognized individuals in an environment and to determine an arrangement of spatial locations of the recognized individuals with respect to each other in the environment;
   assignment circuitry configured to assign media consumption preferences to a defined group based at least in part on a determined arrangement of spatial locations of recognized individuals in the defined group; and
   output circuitry configured to output preferred media information based on assigned media consumption preferences of a defined group of recognized individuals.

2. The system of claim 1 wherein the storage for identification data for individuals comprises storage for facial data.

3. The system of claim 1 wherein the interface configured to receive image data comprises a wired or a wireless interface.

4. The system of claim 1 wherein the interface configured to receive image data comprises one or more camera interfaces configured to receive still images, to receive video images, or to receive still images and video images.

5. The system of claim 1 wherein the assignment circuitry configured to assign media consumption preferences comprises blending circuitry configured to blend media consumption preferences for combinations of defined groups.

6. The system of claim 1 comprising circuitry to determine environmental information for an environment wherein the environmental information comprises at least one member selected from a group consisting of natural lighting, artificial lighting, noise, temperature, and humidity.

7. The system of claim 1 wherein the recognition circuitry comprises facial recognition circuitry.

8. The system of claim 1 wherein the system comprises circuitry configured to locate a remote control and to associate a remote control with an individual.

9. The system of claim 1 further comprising input circuitry configured to receive input of information for individuals and to receive input of information for groups of individuals.

10. The system of claim 1 wherein the assignment circuitry configured to assign media consumption preferences comprises circuitry configured to access one or more remote databases that comprise media information.

11. The system of claim 1 wherein the output circuitry configured to output media information comprises an output interface configured to output selectable preferred media for rendering to a screen for consumption by the defined group.

12. A method comprising:
identifying a group of individuals located in front of a screen using a camera and facial recognition circuitry;
determining an arrangement of spatial locations of the individuals with respect to each other as located in front of the screen;
associating the group with media consumption preferences based at least in part on the arrangement of spatial locations of the individuals with respect to each other as located in front of the screen; and
based on the associating, rendering selectable preferred media choices to the screen.

13. The method of claim 12 further comprising identifying a new group of individuals located in front of the screen; associating the new group with media consumption preferences; and, based on the associating, rendering selectable preferred media choices to the screen.

14. The method of claim 12 further comprising, based on the associating, automatically rendering preferred media to the screen for consumption by the group.

15. The method of claim 12 further comprising sensing environmental information for an environment in which the screen is located wherein the environmental information comprises at least one member selected from a group consisting of natural lighting, artificial lighting, noise, temperature, and humidity.

16. One or more non-transitory computer-readable media comprising computer-executable instructions to instruct a computing system to:
define a group based on a list of individuals;
assign media consumption preferences to defined groups of individuals based at least in part on spatial arrangements of individuals with respect to each other in the defined groups; and
responsive to recognition of individuals that define a group and determination of a spatial arrangement of the individuals with respect to each other in the group, output preferred media choices, the preferred media choices selectable, via a graphical user interface, for rendering to a display for consumption by the group.

17. The one or more non-transitory computer-readable media of claim 16 comprising computer-executable instructions to instruct a computing system to receive media selections from a group and, based thereon, to assign revised media consumption preferences to the group.

18. The one or more non-transitory computer-readable media of claim 16 comprising computer-executable instructions to instruct a computing system to restrict preferred media choices for a group based on age of an individual in a list of individuals that define the group.

19. The one or more non-transitory computer-readable media of claim 16 comprising computer-executable instructions to instruct a computing system to recognize individuals that define a group and to determine a spatial arrangement of the individuals in the group.

20. The one or more non-transitory computer-readable media of claim 16 comprising computer-executable instructions to instruct a computing system to sense environmental information for an environment in which recognized individuals are located and to output preferred media choices based at least in part on the sensed environmental information wherein the environmental information comprises at least one member selected from a group consisting of natural lighting, artificial lighting, noise, temperature, and humidity.

* * * * *